US012771567B2

(12) United States Patent
Raj et al.

(10) Patent No.: US 12,771,567 B2
(45) Date of Patent: Oct. 20, 2026

(54) STITCHING HETEROGENEOUS MULTICAST DOMAINS

(71) Applicant: HEWLETT PACKARD ENTERPRISE DEVELOPMENT LP, Springs, TX (US)

(72) Inventors: Anil Raj, Bangalore (IN); Chakradhara Rao Gollakota, Andhra Pradesh (IN); Tathagata Nandy, Karnataka Bangalore (IN); Subramanian Muthukumar, Chennai (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 846 days.

(21) Appl. No.: 18/149,230

(22) Filed: Jan. 3, 2023

(65) Prior Publication Data

US 2024/0223396 A1 Jul. 4, 2024

(51) Int. Cl.
*H04L 45/16* (2022.01)
*H04L 12/18* (2006.01)

(52) U.S. Cl.
CPC .......... *H04L 12/1836* (2013.01); *H04L 45/16* (2013.01)

(58) Field of Classification Search
CPC .................................................. H04L 12/1836
USPC ........................................................ 370/390
See application file for complete search history.

(56) References Cited

U.S. PATENT DOCUMENTS

2009/0129389 A1* 5/2009 Halna DeFretay .......................... H04L 61/4511 370/392
2013/0170450 A1* 7/2013 Anchan ................... H04W 4/06 370/329
2019/0123922 A1* 4/2019 Suthar ..................... H04L 45/74
2020/0106628 A1* 4/2020 Nainar ................. H04L 12/185

* cited by examiner

*Primary Examiner* — Sibte H Bukhari
(74) *Attorney, Agent, or Firm* — Hewlett Packard Enterprise Patent Department

(57) ABSTRACT

Programmed border gateway devices and a corresponding method are provided for stitching together heterogeneous multicast domains within a network. The method includes programming static multicast routes associated with a given multicast flow into border gateway devices. Based on the static multicast routes, the border gateway devices may send join requests to one or more network devices in their domains and receive a multicast stream in response. The border gateway devices may forward the received multicast stream to other border gateway devices, which may deliver the multicast stream to one or more receiving devices in their respective network domains.

18 Claims, 6 Drawing Sheets

STITCHING HETEROGENEOUS MULTICAST DOMAINS

INTRODUCTION

Various protocols have evolved for routing multicast traffic. For example, both Internet Group Management Protocol (IGMP) and Protocol Independent Multicast (PIM) are used to route multicast traffic in a network. PIM is a known family of protocols that enables the delivery of a stream of information to multiple select destinations within a network without the source device needing to send multiple messages separately addressed to the individual recipients (as would occur with unicast traffic) and also without the messages being sent to every client in the network indiscriminately (as would be the case with broadcast messages). Instead, recipients subscribe to a multicast group associated with a given source of multicast traffic by sending "Join" messages to PIM-enabled networking devices (hereinafter "PIM device"), and then the PIM devices in the network utilize the protocol to determine paths from the source to those clients that have subscribed to the group. Thereafter, when a PIM device receives a multicast stream, the PIM device replicates the multicast packets and forwards them along the determined paths until ultimately the packets are delivered to the multiple clients that have subscribed to the group. There are a number of varieties of PIM, such as PIM-sparse mode (SM), PIM-dense mode (PIM-DM), and various others (all of which are collectively referred to herein as PIM). PIM is often employed for applications where it is desired to send a stream of data, such as a video stream, to multiple clients simultaneously, such as closed circuit television (CCTV) applications where a video stream from a camera may be sent to multiple monitoring stations.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
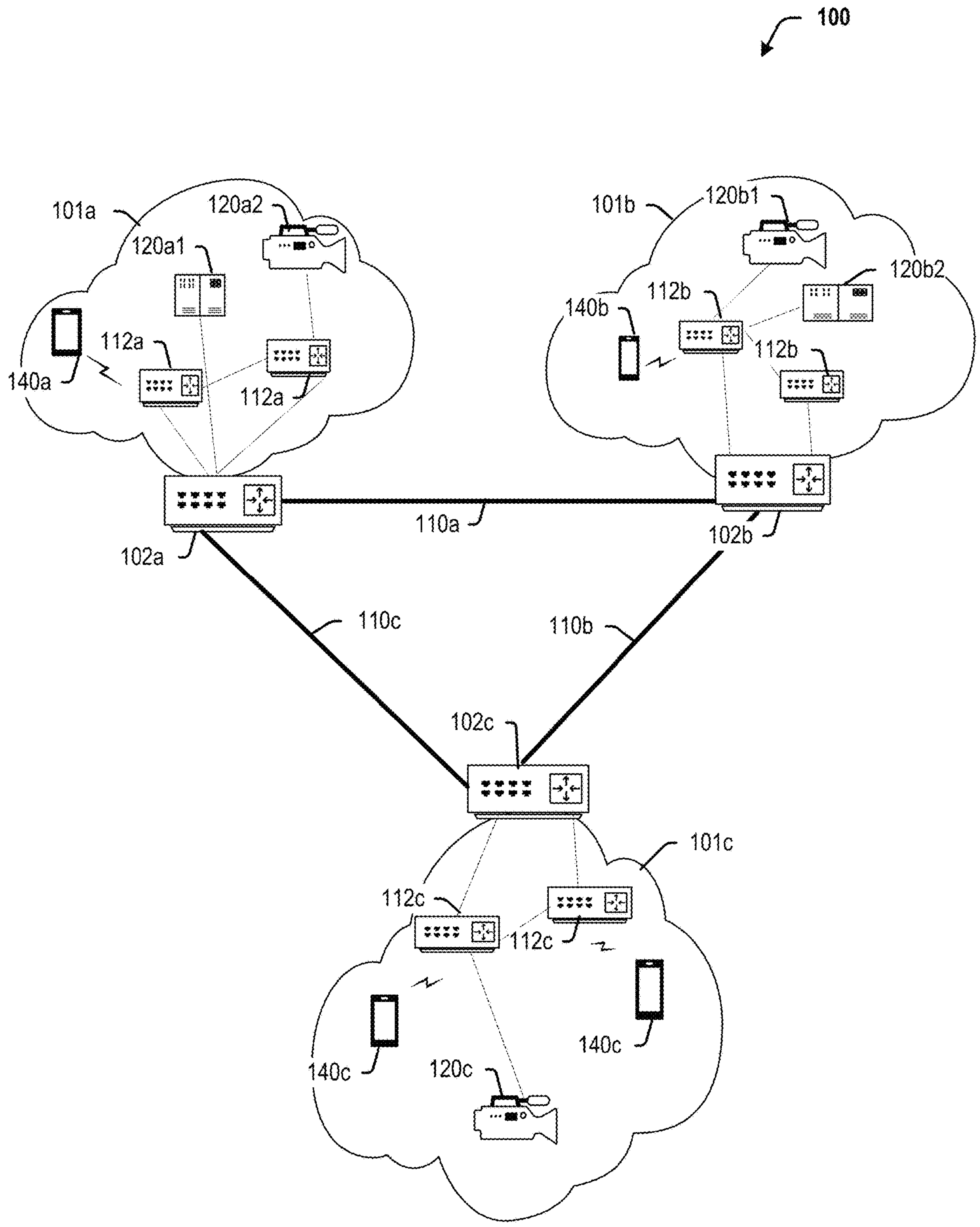
FIG. 1 is a block diagram illustrating border gateway devices for connecting heterogenous multicast domains in a networking environment in accordance with examples set forth herein.

As noted above, various protocols have evolved for routing multicast traffic. In particular, both Internet Group Management Protocol (IGMP) and Protocol Independent Multicast (PIM) are used to route multicast traffic in a network. Furthermore, multiple different PIM protocols have evolved over time. For example, known PIM protocols include PIM-sparse mode (SM), PIM-dense mode (DM), and PIM-source specific mode (SSM).

In some scenarios, a network may comprise multiple network domains coupled together (for example each domain could be associated with a different site, such as a main campus, a branch campus, etc.). These domains may utilize different network protocols (e.g., different multicast protocols) and/or have different administrators and/or policies. These network domains may be coupled together via an intermediate network, such as a public network (e.g., the internet) or an overlay (virtual) network carried on such a public network. One or more border gateway devices may be provided at the edge of each domain to couple the domains to together (via the intermediate network).

As noted above, in a multi-domain network, the network domains may utilize any of a number of multicast protocols to transmit and receive multicast packets within the network, and each network domain running one of these networking protocols is responsible for construction of a multicast delivery tree, which comprises the multicast routes (mroutes) by which multicast traffic will flow through the network. The above-described known multicast routing protocols achieve this by exchanging messages related to the multicast routes (e.g., PIM join messages) in control packets across the networking devices in the domain, with each networking device storing route information (e.g., an mroute) for each multicast flow having a delivery path passing through that networking device.

Because so many different protocols exist for handling multicast traffic, heterogeneous multicast domains using different protocols are unable to efficiently share multicast traffic with each other. This inability of the network domains to connect with one another may be caused by the use of different network protocols by the different domains, as the network domains using a particular multicast protocol may be unable to understand the multicast message sent from other domains using other multicast protocols. In addition, even if these domains utilize the same multicast protocol, they nevertheless may not be able to share multicast traffic with one another because sources and clients in one network domain may not be visible to another network domain and thus the networking devices may be unable to effectively build a multicast delivery tree that spans both domains. In addition, the domains may be connected over a public network such as the internet, and it may not be desired to send multicast command messages over such a network.

Accordingly, examples disclosed herein provide border gateway devices for each network domain within a network, wherein the border gateway devices are configured to utilize both a traditional multicast protocol (like PIM) and static multicast. Static multicast refers to programming multicast routes (also called flows) statically into networking elements, for example by an administrator or other user, or automatically by a network component, rather than using a protocol like PIM to dynamically discover and build multicast routes. The border gateway devices may be configured to utilize static multicast routes for multicast traffic flowing between different domains, or in other words traffic flowing between two border gateway devices. On the other hand, for traffic flowing between the border gateway device and the rest of the network domain of which it is a part, the border gateway device may utilize the traditional multicast protocol utilized by that domain.

For example, if a user wants to allow sharing of a given multicast flow between two separate network domains, this can be enabled by programming static multicast routes associated with that given flow into each of the border gateway devices of the two network domains. In addition, if the border gateway device is part of the network domain to which a source of the multicast flow is coupled, then in response to having a static multicast route for that flow programmed therein the device will generate a join message corresponding to the multicast route in the multicasting protocol of the network domain. These join message may be sent to the other networking devices in the domain, and from these messages the other multicast enabled devices in the domain can construct a delivery tree utilizing the protocol in the usual fashion. As a result of these operations, when the source associated with the given flow generates a multicast stream, the networking devices in the same domain as the source will know to forward that data from that stream to the border gateway device of that domain (the other devices forward the stream to the border gateway device because of the join messages the border gateway device sent). When the outgoing multicast stream from within a domain reaches the border gateway device of the domain from the other devices in the domain, the border gateway device will know to which other border gateway device(s) to forward the stream based on the pre-programmed static multicast route for the given flow. Once the stream reaches the other border gateway device of the other domain, the other border gateway device will forward the flow to one or more of the other network devices in its domain based on the static multicast route programmed therein, and from there the other network devices in the domain can proceed to forward the flow to any subscribed clients in the usual fashion using whichever multicast protocol that domain prefers.

To ensure connectivity between heterogeneous multicast domains, examples provided herein include a method for programming first and second border gateway devices disposed respectively in first and second multicast domains with static multicast routes associated with a given multicast flow. The first and second multicast domains may, for example use different types of multicast protocols, which may be two different types of PIM protocols or other types of multicast protocols. The static mroute includes information identifying the multicast flow, an incoming interface, and one or more outgoing interfaces. The outgoing interfaces specified in a given mroute are the interfaces of the gateway device to which received data will be forwarded if the received data is associated with the flow specified in the mroute and is received at the incoming interface specified in the mroute. In examples provided herein, the first border gateway devices sends join requests from the first border gateway device to at least one other network device, for example a source device, in the first multicast domain utilizing a multicast protocol of the first multicast domain in response to the programming of the static multicast route at the first border gateway device.

The programming of the static mroute may, for example, be achieved manually, such as through a user interface or an application program interface (API) or alternatively may be achieved automatically through a network controller. The information identifying the given multicast flow in the programmed static multicast routes may in one example, include source identification and group identification. In another example, the information may include group identification and a wildcard for identifying any source.

In further examples, in order to distribute a multicast stream from the first domain, the border gateway device at the first domain receives the multicast stream from the source in the first multicast domain and forwards the multicast stream to other border gateway devices, such as the second border gateway device based on the static mroute programmed at the first border gateway device. The forwarding may be accomplished, for example, through a virtual LAN (VLAN) tunnel and may be achieved without sharing any multicast control packets. Ultimately, the multicast stream is delivered from the second border gateway device to one or more devices in the second multicast domain based on the static multicast route programmed at the second border gateway device. Further, the multicast stream may be delivered from the second border gateway device to another border gateway device based on the programmed static mroute.

In additional examples, the second border gateway device receives a join request from a client device in the second multicast domain indicating that the client device would like to receive the multicast stream. In response to this join request, the second border gateway delivers the multicast stream to the requesting device. To achieve this functionality, in some examples, the programming is accomplished by initially entering the static mroute into a multicast routing information base (RIB) and subsequently copying information about the static mroute from the RIB into a multicast forwarding information base (FIB) at the border gateway device in response to the received join request in order to deliver the multicast stream. If packets for a given flow are received by the second border gateway prior to the mroute for that flow being copied from the RIB to the FIB, then those packets are not forwarded by the second border gateway into the second muticast domain, whereas if packets for the given flow are received after the mroute for that flow has been copied from the RIB to the FIB, then those packets are forwarded by the second border gateway into the second multicast domain according to the static mroute (i.e., to the outgoing interfaces specified in the static mroute). Note that, in these examples, the static mroute is not constructed based on the received join requests (the static mroute having already been programmed into the gateway prior to receiving the join requests), but rather in these examples the receipt of a joint request acts as a triggering condition to enable copying of the static mroute into the FIB and hence the beginning of forwarding packets into the domain according to the static mroute. Providing this additional condition may help to avoid the gateway forwarding unneeded traffic associated with a given flow into the second domain when no clients have subscribed to the flow. However, in other examples, the static mroute may be copied from the RIB to the FIB without waiting for any join requests (e.g., as soon as the static mroute is entered into the RIB). In these examples, a received stream may be forwarded into the domain even if no clients have subscribed to the corresponding flow, in which case the other network devices in the domain may simply drop those forwarded packets.

Turning now to the figures, various devices, systems, and methods in accordance with aspects of the present disclosure will be described.

FIG. 1 is a block diagram illustrating an exemplary network environment 100 for routing of multicast traffic. The network environment 100 may include multiple network domains 101*a*, 101*b*, and 101*c*. The network domains 101*a*, 101*b*, and 101*c* (collectively referenced as 101) may utilize various multicast protocols, such as for example PIM protocols or IMPG protocols. In examples described herein, at least one network domain utilizes a different multicast protocol from other network domains. For example, one network domain utilizes PIM-SM and another network domain utilizes PIM-DM. In other examples, the network domains 101 utilize the same protocols but have different administrators or are separated by administrative or security boundaries and devices in one network domain are not visible to another network domain.

A border gateway device 102*a*, 102*b*, 102*c* (collectively referenced as 102) connects with a corresponding network domain 101. In the illustrated example, the border gateway devices 102 connect with other border gateway devices 102 using an interface 110*a*, 110*b*, 110*c* (collectively 110). The interfaces 110 may, for example, be virtual interfaces such as VLAN tunnels. In examples in which the interfaces 110 are virtual interfaces, the network may also comprise underlying physical hardware (not illustrated), such as communications cables, routers, and other networking devices, upon which the virtual interfaces 110 are overlaid.

A plurality of devices reside in each network domain 101. For example, source devices 120*a*, 120*b*, 120*c*, (collectively 120) client devices 140*a*, 140*b*, 140*c*, (collectively 140) and PIM routers 112*a*, 112*b*, 112*c*, (collectively 112) reside within the network domains 101. In some instances, a network domain such as 101*b* includes multiple source devices 120*b*1 and 120*b*2. The source devices 120 may be or include any device capable of generating and distributing a multicast stream. Multiple client or receiver devices 140 may also be included in the network domains 101. The client and receiver devices 140 may be or include any device capable of receiving a generated multicast stream. In the illustrated example, multiple PIM routers 112 may also be included in the network domains. However, the provision of other types of routers is within the scope of the disclosure and any routers or switches capable of routing information in the native protocol of the corresponding domain 101 may be used. In one example, the multiple devices inside of each domain 101 communicate through PIM enabled interfaces.

Figure 2:
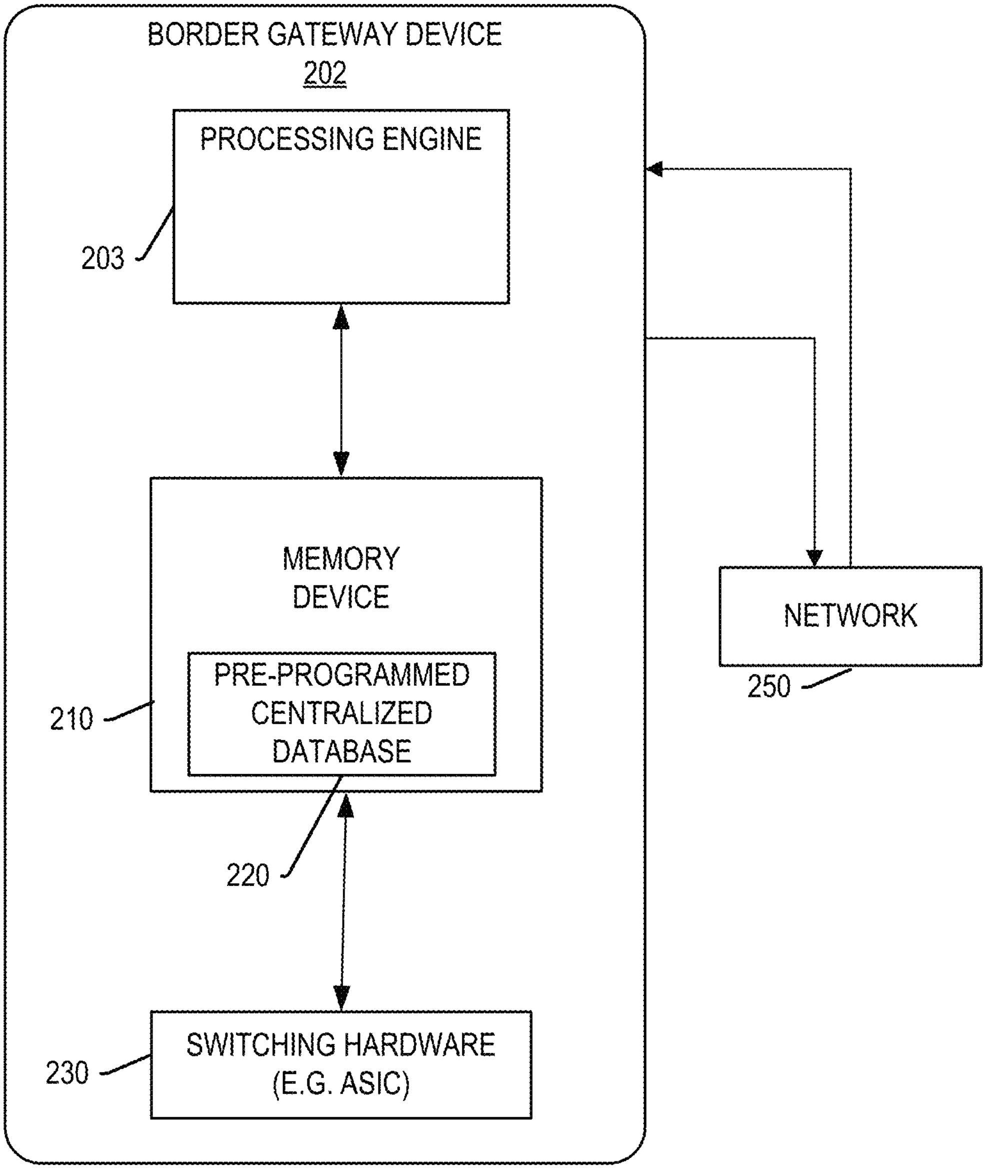
FIG. 2 is a block diagram illustrating a border gateway device in accordance with examples set forth herein.
Figure 3:
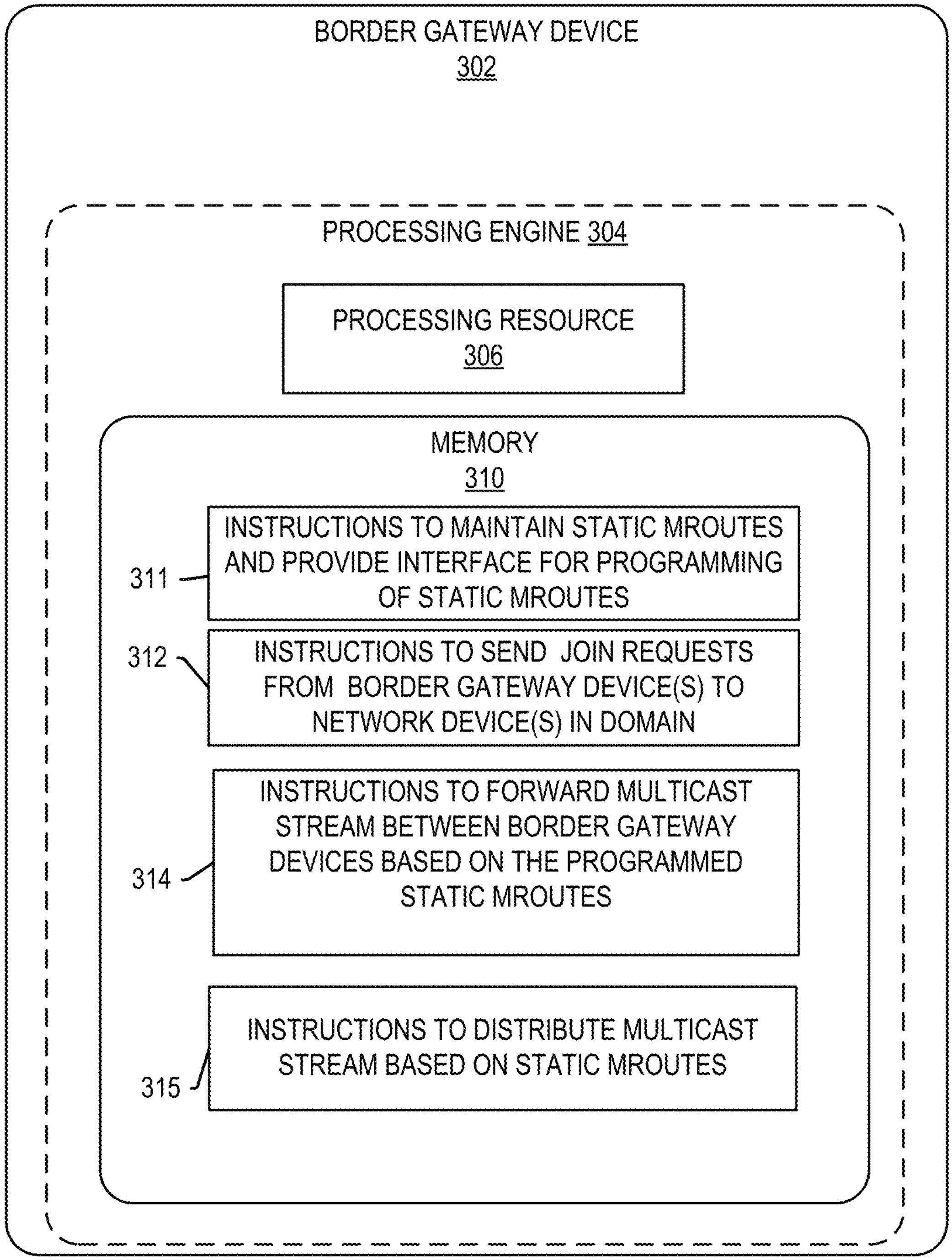
FIG. 3 is a block diagram illustrating further details of a border gateway device storing instructions in accordance with examples described herein.

The border gateway devices 102 may be configured to utilize both a traditional multicast protocol (like PIM) and static multicast, as described above. In particular, the border gateway devices 102 may be configured to receive programming of static multicast routes (e.g., manually or via a separate devices such as a network controller (not illustrated)). The border gateway devices 102 may be configured to utilize static multicast routes for multicast traffic flowing between different domains 101, or in other words traffic flowing between two border gateway devices 102. On the other hand, the border gateway devices 102 may forward multicast traffic into their respective domains 101 utilizing the multicast protocol utilized by that domain 101. FIGS. 2 and 3 illustrate example configurations of border gateway devices that may be used as the border gateway devices 102, which will be described in greater detail below.

FIG. 2 is a block diagram illustrating a border gateway device 202 storing instructions in accordance with examples set forth herein. The border gateway device 202 is one example configuration of the border gateway device 102. Non-limiting examples of the border gateway device 202 include a computing device, a router, switch, etc. As illustrated, the border gateway device 202 may be connected to other computing devices in the network. As used herein, a "computing device" may include a server, a networking device, a chipset, a desktop computer, a workstation, a mobile phone, a tablet, an electronic reader, or any other processing device or equipment.

Border gateway device 202 includes a processing engine 204, a memory device 210, and switching hardware 230. In the illustrated example, the border gateway device 202 connects with a network 250 which may be a network for routing multicast traffic. The network 250 may comprise other computing devices, including networking devices similar to border gateway device 202.

The memory device or system 210 may be a machine readable storage medium or a non-transitory computer-readable. As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. Further, the memory device or system may include multiple different memory devices such as a RAM and a ternary content-addressable memory (TCAM) and/or other memory devices.

Memory device or system 210 may incorporate a centralized database 220 storing network information, such as databases including a multicast routing information base (MRIB) and multicast forwarding information base (MFIB). The memory device 210 may be a non-volatile memory device (e.g., flash memory, battery-backed RAM, etc.) The database 220 is referred to as "centralized" because it is accessible to all components of the border gateway device 202. However, the MFIB and MRIB may be stored in different parts of the memory system 110, for example, the MFIB may be stored in the TCAM and the MRIB may be stored in RAM. The centralized database 220 may, for example, be an Open vSwitch Database (OVSDB). The centralized database 220 may store information related to different components in the border gateway device 202, including information associated with multicast flows including static mroutes. The different information may be stored in different tables in the centralized database 220. This information is also accessible for programming of the switching hardware 230. Other non-limiting examples of information stored may include information regarding addresses for multicast groups (e.g., in an Mroute table), next hop information, etc.

The switching hardware 230 comprises the underlying physical communication pathway that communicates the data, such as the physical interfaces (e.g., ports) and the internal switching fabric that selectively connects these ports together (e.g., a crossbar array or other physical data communication lines). The switching hardware 230 may also comprise control circuitry that controls and enables the aforementioned underlying physical communication pathways. This control circuitry may be or include, for example, an application-specific integrated circuit (ASIC), a field programmable gate array (FPGA), a complex programmable logic device (CPLD), a programmable array logic (PAL), or other type of switching hardware. The border gateway device 202 may be configured to program the switching hardware 230 based on the centralized database 220. In other words, the data stored in the centralized database 220 controls how the switching hardware 230 operates to forward data, for example controlling which outgoing interfaces will have certain data forwarded to them.

The processing engine 204 may be any combination of hardware (e.g., a processor such as an integrated circuit or other circuitry) and software (e.g., machine or processor-executable instructions, commands, or code such as firmware, programming, or object code) to implement the functionalities of the engine 204 as described herein. This hardware and/or software that constitute (or instantiates) the processing engine 204 may also be referred to herein as processing circuitry. Further, as used herein, the singular forms "a," "an," and "the" include plural referents unless the context clearly dictates otherwise, Thus, for example, the term "engine" is intended to mean at least one engine or a combination of engines. Thus, more than one processing engine 204 may be included. The processing engine 204 of the border gateway device 202 can include at least one machine-readable storage medium and at least one computer processor. For example, software that provides the functionality of engines on networking device can be stored on a memory 210 of the border gateway device 202 to be executed by a processor of the border gateway device 202.

The processing engine 204 may be configured to facilitate the programming of static multicast routes. For example, the processing engine 204 may include a programmable interface which may be controlled manually by a user or alternatively may be programmed automatically by a controller. In one example, programming of the static multicast routes, may comprise specifying a particular source S and group G for the mroute. This combination of a particular source and group may be referred to herein as an (S, G) multicast flow. Programming the multicast route for a given (S, G) multicast flow may also comprises specifying an incoming interface at which data associated with the flow is expected to be received and a list of outgoing interfaces to which the data from that flow is to be forwarded.

For example, referring again to FIG. 1, on border gateway device 102*b*, which is part of domain 101*b*, a hypothetical static multicast route for a given (S, G) multicast flow which is associated with the source device S1 (e.g., source device 120*b*1) and a multicast group G1 may be programmed as shown in Table 1 below. This static multicast route indicates that when data from source S1 (device 120*b*1) for group G1 is received at the incoming interface Iface 2, this data should be forwarded to interface 110*a*.

TABLE 1

| Flow | Incoming Interface | Outgoing Interface |
|---|---|---|
| S1, G1 | Iface 2 (Domain 102b) | Interface 110a (VxLAN tunnel between 102b and 102a) |

The processing engine 204 may also be configured to utilize a multicast protocol of the domain to which the border gateway device 202 is connected for certain communications related to that domain. In particular, when the border gateway device 202 is connected to a domain that has a source of a given flow, then in response to a multicast route for that flow being programmed into the border gateway device 202, the processing engine 204 may send a join request to neighboring network devices in the domain utilizing whichever multicast protocol that domain uses.

For example, returning to FIG. 1, suppose that the domain 101*b* utilizes a PIM protocol, in that case a PIM protocol may be enabled on the border gateway device 102*b*. Sources within the domain 101*b* may initially register to the border gateway device via a native PIM path. Moreover, in response to the static multicast route shown in table 1 being programmed into the border gateway device 102*b*, the processing engine 204 thereof may send join requests for the flow (S1, G1) to the PIM routers 112*b*. These join request cause the PIM routers 112*b* to create an upstream (S, G) state for the flow (S1, G1). In other words, the PIM routers 112*b* create (or update) multicast routing entries in their own databases to forward data of the flow (S1, G1) to border gateway device 102*b*. In contrast to conventional PIM operation, in which receipt of a multicast data packet is required to create the upstream (S, G) state in the PIM routers 112*b*, the receipt of the join request from the border gateway device 102*b* creates the upstream (S, G) state in the PIM routers 112*b*. As a result of the PIM routers 112*b* creating these multicast routes based on the join received from the gateway device 102*b*, when the source 120*b*1 generates a data stream for group A, the PIM routers 112*b* will forward that stream on to the border gateway device 102*b*. When the border gateway device 102*b* eventually receives this stream, it will forward the data according to the static multicast route programmed therein, i.e., it will forward the data to interface 110*a* (and thus to the device 102*a*).

Similarly on the border gateway device 102*a*, which is part of domain 101*a*, in which multicast client 140*a* is connected, a hypothetical multicast route for the given (S, G) flow associated with source S1 (e.g., source device 112*b*) and group G1 is programmed as shown in Table 2 below. This static multicast route indicates that when data of the flow (S1, G1) is received at the incoming interface 110*a*, this data should be forwarded to interface Iface 1 in domain 101*a*.

TABLE 2

| Flow | Incoming Interface | Outgoing Interface |
|---|---|---|
| S1, G1 | Interface 110a (VxLAN tunnel between 102b and 102a) | Iface 1 (Domain 101a) |

On the border gateway device 102*a*, the static multicast route configured will help forward the multicast traffic received on the VLAN tunnel 110*a* into network domain 101*a*. PIM enabled routers 112*a* in network domain 101*a* may have pending joins for the source S1 and group G1, for example from client 140*a*, and when the multicast traffic reaches the PIM enabled routers 112*a*, they will program the multicast route for the flow (S1, G1) according to the standard PIM protocols and forward the multicast stream according to these routes to client 140*a*. In this example, since the source S is known, PIM immediately switches to Source specific Tree (SPT).

Another way of programming the static multicast route allows for a flow to include multiple sources. On an incoming interface I1, when there are multiple potential sources sending multicast traffic to a single group G, and if the outgoing interfaces are also the same, then instead of having individual multicast flows for every (I1, Si, G) where i=1 . . . n, a single summarized (*, G) multicast flow entry on interface I1 at border gateway device 102 is programmed, where * is a wildcard indicating any source (as opposed to an identification of one particular source as would be found in an (S, G) flow). The programming of one static multicast route encompassing multiple sources helps in saving hardware resources.

Two types of (*, G) summarization may be utilized. In a first type, which is implicit summarization, a network administrator or controller configures multiple static multicast flows with the same group address, the same incoming and outgoing interfaces, but different source addresses. These routes are implicitly summarized into a single (*, G) multicast flow entry. In alternative explicit type of summarization, the network controller or administrator explicitly configures a summarized (*, G) static multicast flow without specifying the source address.

For example, returning to FIG. 1, programming of static multicast routes based on hypothetical summarized (*, G) flows will be described in relation to border gateway device

102*b*. Suppose that there are two different sources from domain 101*b*, such as source S1 (102*b*1) and source S2 (102*b*2), and that both sources are sending traffic to the same multicast group G2. The border gateway device 102*b* is aware of the sources S1 (120*b*1) and S2 (120*b*2) since these sources have registered to the border gateway device 102*b* using the native PIM protocol for the domain 101*b*. With implicit summarization, the static multicast flows are programmed via the processing engine 204 for both sources S1 and S2 and the same group G2, with the same incoming and outgoing interface as shown in Table 3 below.

TABLE 3

| Flow | Incoming Interface | Outgoing Interface |
|---|---|---|
| S1, G2 | Iface 2 (Domain 101b) | Interface 110a (VxLAN tunnel between 102b and 102a) |
| S2, G2 | Iface 2 (Domain 101b) | Interface 110a (VxLAN tunnel between 102b and and102a) |

Thus, multicast traffic incoming on interface 2, destined to group G2 from sources S1 and S2, will be routed to interface 110*a*. The two above-identified multicast routes can be summarized into one multicast route as shown in Table 4 below. In some examples, the processing engine 204 may be configured to automatically summarize such static multicast entries. That is, in response to detecting two or more static multicast entries that satisfy the criteria noted above in relation to implicit summarization, the processing engine 204 may convert the entries into a single summarized multicast route such as the one shown in Table 4.

TABLE 4

| Flow | Incoming Interface | Outgoing Interface |
|---|---|---|
| *, G | Iface 2 (Domain 1010b) | Interface 110a (VxLAN tunnel between 102b and 102a) |

Similarly on border gateway device 102*a*, the summarized static multicast flow will be programmed as shown in Table 5 below.

TABLE 5

| Flow | Incoming Interface | Outgoing Interface |
|---|---|---|
| *, G | Interface 110a (VxLAN tunnel between 102b and 102a) | Iface 1 (Domain 101a) |

This static multicast route helps forward the multicast traffic received by the border gateway device 102*a* on the interface 110*a* into domain 101*a*.

With implicit summarization, as the individual multicast entries are programmed, join requests for each entry may be sent out to PIM routers 112*b* in the same manner as described above with respect (S, G) flows. Since the particular sources are known, an upstream (S, G) state is created in each PIM router 112 that receives the join request.

In contrast, for explicit summarization, a static multicast flow is programmed with no mention of the source. This may be similar to the flows shown in Tables 5 and 6 above.

Thus, the multicast traffic incoming on border gateway device 102*b*, destined to group G from any source, will be routed to Tunnel 110*a*. On border gateway device 102*b*, this summarized static multicast flow is exported as join requests to PIM routers 112*b* in network domain 101*b*. Since the source is not known in this case, PIM creates an Upstream (*, G) state and sends a (*, G) PIM join towards the routers. Border gateway device 102*b* will be aware of all the sources since they would have registered to the border gateway device 102*b* via the native PIM protocol.

The processing engine 204 may also include a PIM module implementing a multicast flow protocol within each of the network domains, such as protocol in the PIM family of protocols (e.g., PIM-SM, PIM-source specific mode (SSM), etc.). Accordingly, the processing engine 204 may allow the border gateway device 202 to process and route multicast flow packets received by the border gateway device 202. During its processing of multicast flow packets, the processing engine 204 may understand the multicast environment of the border gateway device 202, determine routing paths that should be programmed into the switching hardware 230 of the border gateway device 202 and perform other functions associated with processing multicast traffic. The processing engine 204 may keep records of the determined multicast routes, as well as of the states of other components of the networking device 100. Accordingly, the processing engine 204 may comprise a memory storing this information. In addition, the processing engine 204 will publish information to the central database 220, and as a result this information being added to the database 220 the state of the switching hardware 230 may be changed. Thus, the processing engine 204 is able to control aspects of the programing of the switching hardware 230.

FIG. 3 is a block diagram illustrating a border gateway device 302 in accordance with examples set forth herein. The border gateway device 302 may be one example configuration of the border gateway devices 202 and 102 described above. The border gateway device 302 includes a processing engine 304, which may be one example configuration of the processing engine 204 described above with reference to FIG. 2. Some aspects of the processing engine 304 may be similar to aspects of the processing engine 204 already described above and duplicative description thereof is omitted. The border gateway device 302 may include additional components which are omitted from FIG. 3, such as a PIM module, a memory device storing a central database, and switching hardware, like those described above in relation to the border gateway device 302.

In the exemplary border gateway device 302, the processing engine 304 includes both a processing resource 306 and a memory 310. The processing engine 304 may comprise, or may be instantiated on or by, the processing resource 306 executing machine readable instructions to perform operations described herein. The processing resource 306 may execute instructions described below to perform the functions described herein.

The memory device 310 may be a machine readable storage medium or a non-transitory computer-readable medium and may store instructions 311, 312, 314, and 315. As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

The processing resource 306 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium such as the memory 310. The processing resource 306 may, for example, include single or multiple cores on a chip, multiple core across multiple chips or devices, or suitable combinations thereof. The processing resource 306 is configured to fetch, decode, and execute instructions stored in the memory 310 as described herein.

Instructions 311 may be executable by the processing resource 306 to maintain static mroutes and provide an interface for programming of the static mroutes. The interface for programming of static mroutes may be, or include, for example, a flexible Application Programming Interface (API) supporting a template of entries. The template may correspond to the entries provided in Tables 1-5 above. Moreover, the border gateway device 102 may obtain the configuration information from a management platform, such as a controller, and generate the entries based on the above-mentioned template.

Instructions 312 to send join requests from the border gateway device to network devices in the domain of the border gateway device may be executed by the processing resource 306 in response to a static mroute being programmed into the border gateway device 302 on condition that the border gateway device 302 is part of the same domain as the source of the flow associated with the static mroute. If the border gateway device 302 is not part of the same domain as the source of the flow, then the border gateway device 302 does not execute instructions 312. The instructions 312 cause the border gateway device 302 to send join requests to neighboring network devices in the domain, wherein the join requests are associated with whichever flow the programmed static mroute was associated with. The join requests are sent using whichever multicast protocol is used in the domain and specify the same flow (e.g., source and group) as the static multicast entry. For example, the border gateway device may send join requests to routers and source devices within its network domain.

Instructions 314 cause the processing resource 306 to forward a received multicast stream from the border gateway device 302 to another border gateway device based on the programmed static mroutes. That is, the instructions 314 cause the border gateway device 302 to, in response to receiving a stream from a source within its own domain, consult the static mroutes programmed therein and determine if any of those static mroutes correspond to a flow (source and group) of the received stream. If there is a static mroute corresponding to the received stream, then the instructions 314 cause the border gateway device 302 to forward the stream to the outgoing interfaces listed in the static mroute. Thus, for example, in accordance with the hypothetical mroutes specified in Table 1 above and with reference to FIG. 1, if the border gateway device **102*b* receives a stream from the source 102*b*1, the instructions 314 would cause the border gateway device 102*b* to forward the stream to interface 110*a*, and hence to border gateway device 102*a* associated with network domain 101*a***.

Instructions 315, when executed by the processing resource 306, dictate distribution of a multicast stream based on the static mroutes. Specifically, in response to receiving a multicast stream from another border gateway device, the border gateway device 302 may execute instructions 315. These instructions 315 cause the border gateway device 302 to determine if there is a static mroute programmed therein corresponding to the received multicast stream, and if so to forward the stream to the outgoing interfaces specified in the static mroute, which may include devices in the network domain of the border gateway device 302 and/or additional border gateway devices.

In some examples, the instructions 315 may be further configured to cause processing of join requests received from network devices in the domain, such as client or receiving devices, e.g, **140*a*, 140*b*, 140*c*. In some examples, the border gateway device 302** may refrain from forwarding the stream according to the static mroute until and unless a join request has been received.

Border gateway device 302 of FIG. 3, which is described in terms of engines containing hardware and software, can include one or more structural or functional aspects of the border gateway device 202 of FIG. 2. The border gateway devices 102, 202, 302 may be similar to one another. Such similar components may be referred to herein using the same last two digits (for example, centralized database 220). These similar components may be configured similarly, except when noted otherwise or where logically contradictory, and thus descriptions herein of such component may be applicable to the other similar components. Accordingly, duplicative descriptions of such components are omitted herein.

Figure 4:
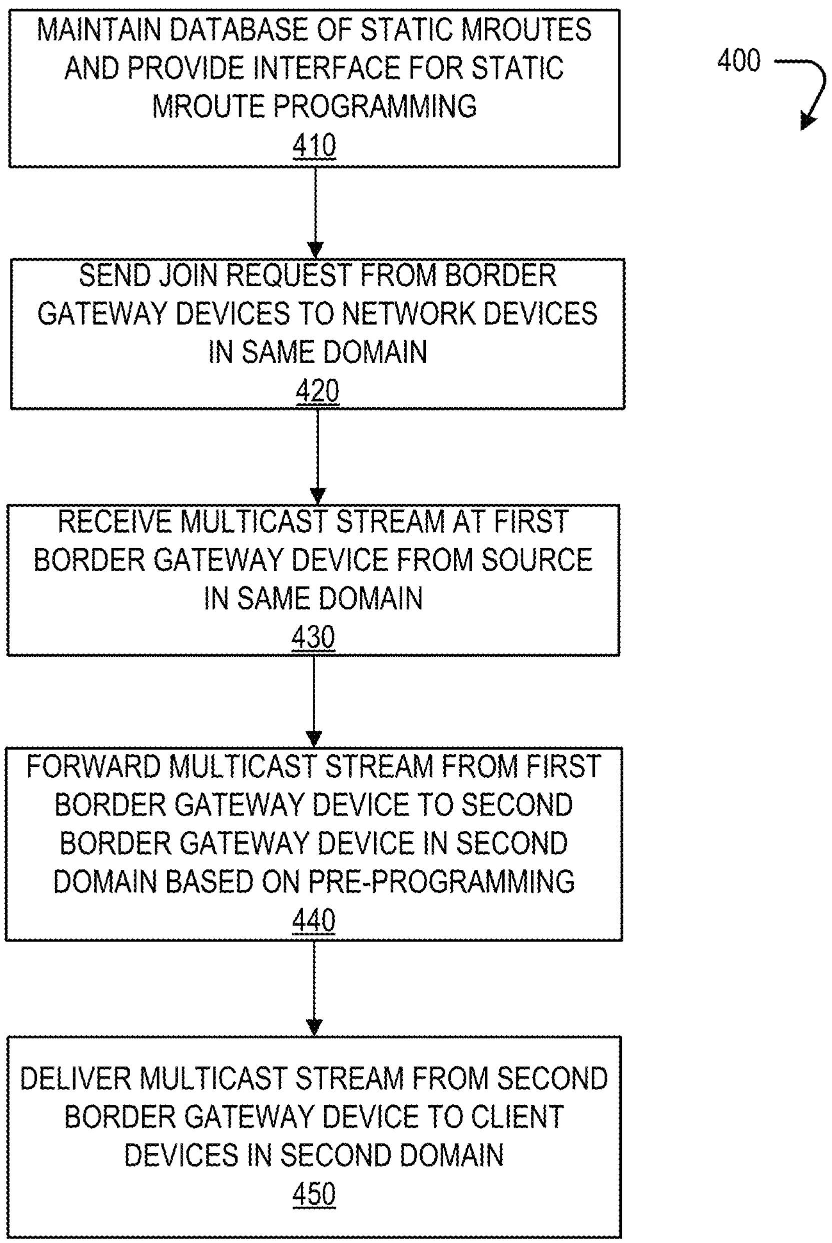
FIG. 4 is a flow diagram illustrating a method for connecting heterogeneous multicast domains in accordance with examples set forth herein.

FIG. 4 is a flow diagram illustrating a method 400 for connecting heterogeneous multicast domains in accordance with examples set forth herein. Method 400 may be performed by, for example, processing engine 204 or 304. The method 400 may further be performed by a combination of processors. In some examples, the method is performed by one or more processors executing machine readable instructions that comprise, at least in part, instructions corresponding to the operations of method 400. For discussion purposes, as an example, method 400 is described as being performed by the processing engine 204.

Method 400 starts in step 410, in which the processing engine 204 maintains a database of static mroutes and provides an interface for static mroute programming. The static mroutes may be programmed either manually or automatically, through an API providing a template located at each border gateway device. When manually programmed, the static mroutes may be configured via a user interface. When automatically programmed, the static mroutes may be programmed at the border gateway devices 202 using a network controller. Thus, in step 410, the processing engine 204 of the border gateway device 202 maintains programming of a static mroute associated with a multicast flow. Each of the static mroutes may include information identifying the multicast flow, such as source and group, and an incoming and outgoing interface. In some examples, the information identifying the given multicast flow in the programmed static multicast routes includes information identifying a source and information identifying a multicast group. In other examples, the information identifying the given multicast flow in the programmed static multicast routes comprises information identifying a multicast group and a wildcard for indicating any source. In examples set forth herein, the static mroute may be stored in a multicast routing information base (MRIB).

In step 420, in response to the programming of a static mroute in step 410, the processing engine 204 of the border gateway device causes join requests to be sent to network devices in its corresponding domain. For example, with reference to FIG. 1, the border gateway device **102*b* sends join requests to network devices including, for example, 112*b*, 120*b*, and 140*b*. The join requests allow the network devices 112*b*, 120*b*, and 140*b*, to become aware of the border gateway device 102 and the programmed static mroute. In some examples, step 420** is performed only when the border gateway device is in a same domain as the source specified in the programmed static mroute.

In step 430, the processing engine 204 causes the border gateway device 202 to receive a multicast stream from a source in its same domain. Thus, when the sources become aware of the programmed static mroute in step 420, they respond by sending a multicast stream to the border gateway device 204.

In step 440, the processing engine 204 of the border gateway device 202 causes the received multicast stream to be forwarded to another border gateway device. For example, with respect to FIG. 1 and assuming the hypothetical mroutes shown in Tables 1-5, the border gateway device 102*b* causes a multicast stream received from sources 120*b* to be forwarded through interface 110*a* to the border gateway device 102*a*. The multicast stream is forwarded from the first border gateway device 102*b* to the second border gateway device 102*a* without sharing any multicast control packets between the first and second border gateway devices.

In step 450, the processing engine 204 of the receiving border gateway device (e.g. border gateway device 102*a* in FIG. 1) delivers the received multicast stream to client devices (e.g., device 140*a*) in its domain. In accordance with the static multicast programming, if a multicast stream is routed through the border gateway device 202, the processing engine 204 of the border gateway device 202 can deliver the multicast stream to devices within its domain.

In some examples, the processing engine 204 of the border gateway device 202 may copy or publish information about the static multicast route from the RIB into a forwarding information base (FIB) stored in the centralized database 220 in response to the received join request in order to deliver the multicast stream. In some examples, the border gateway device 202 receives join requests transmitted from devices in its domain. Join requests are transmitted from devices in the domain using a native protocol of the domain when the devices want to receive a multicast stream. In response to the join requests, the processing engine 204 of the border gateway device 202 causes the multicast stream to be delivered from the border gateway device 202 to requesting devices within its domain.

Figure 5:
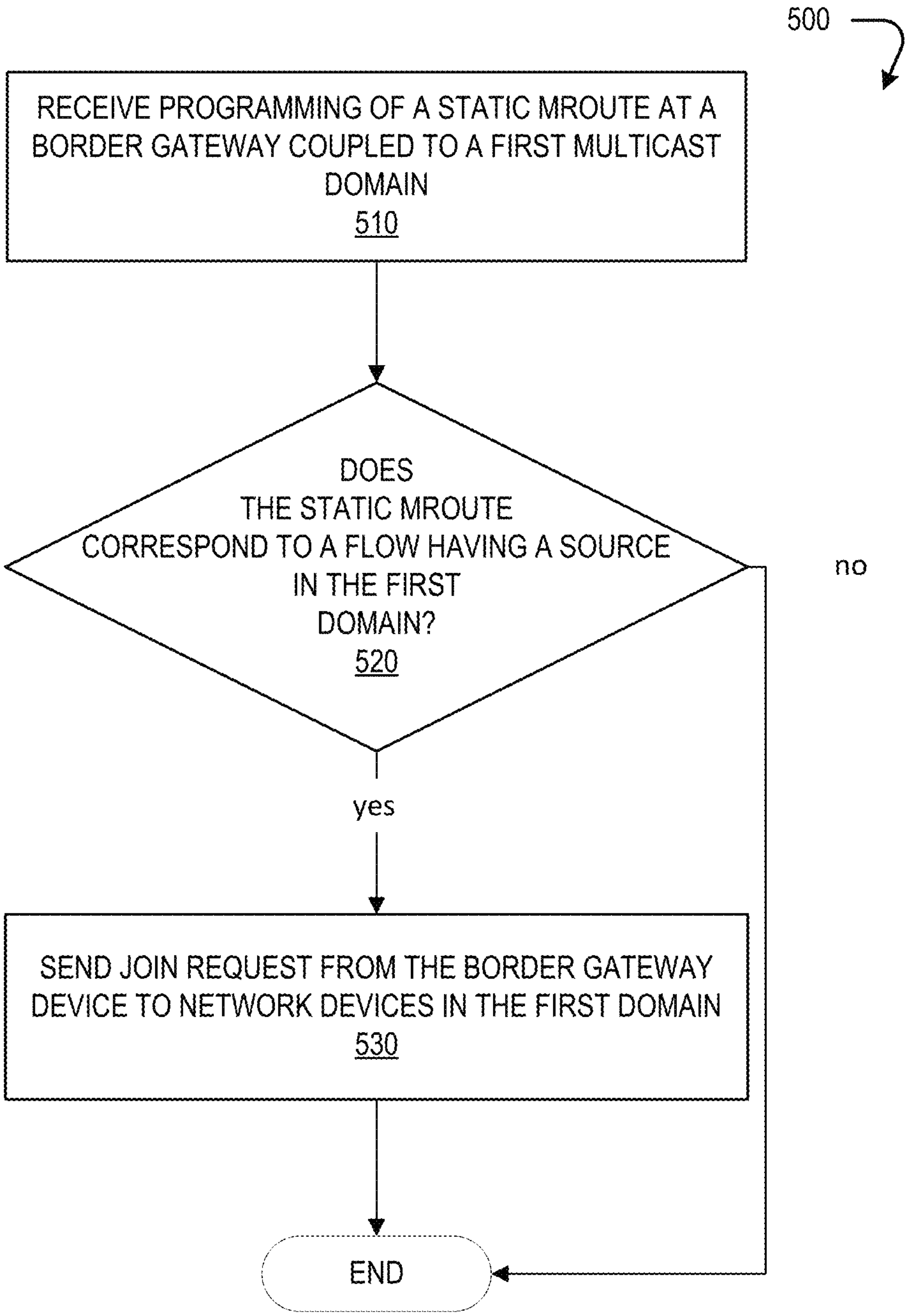
FIG. 5 is a flow diagram illustrating further details of a method for connecting heterogeneous multicast domains in accordance with examples set forth herein.

FIG. 5 is a flow diagram illustrating further details of a method for connecting heterogeneous multicast domains by in accordance with examples set forth herein. Method 500 may be performed by processing engines 204 or 304. The method 500 may further be performed by a combination of processors. In some examples, the method is performed by one or more processors executing machine readable instructions that comprise, at least in part, instructions corresponding to the operations of method 500. For discussion purposes, as an example, method 500 is described as being performed by a border gateway device 102*b*. However, it should be understood that the steps may be performed by a processing engine of the border gateway device 102*b*, such as the processing engine 204.

The method 500 provides a more specific example of portions of the method 400, as well as other operations. Specifically, the method 500 may be performed as a more detailed implementation of block 420 of the method 400. In step 510, the border gateway device 102*b* receives static mroute programming substantially as described above with respect to step 410.

In step 520, a processor of the border gateway device 102*b* determines if the programmed static mroute corresponds to a flow having a source in the first domain. As set forth above, the static mroutes include source and group information and thus, the processor of the border gateway device 102*b* is able to determine whether the flow corresponds to a source in the domain 102*a* of the border gateway device 102*b*.

If at step 520, the border gateway device 102*b* finds that the static mroute corresponds to a flow having a source in the domain 101*b*, then the border gateway device 102*b* sends a join request to the network devices in the domain 101*b*. However, if in step 520, the border gateway device finds that the static mroute does not correspond to a flow having a source in the first domain in step 520, the border gateway device 102*b* does not send the join request and the process ends.

Figure 6:
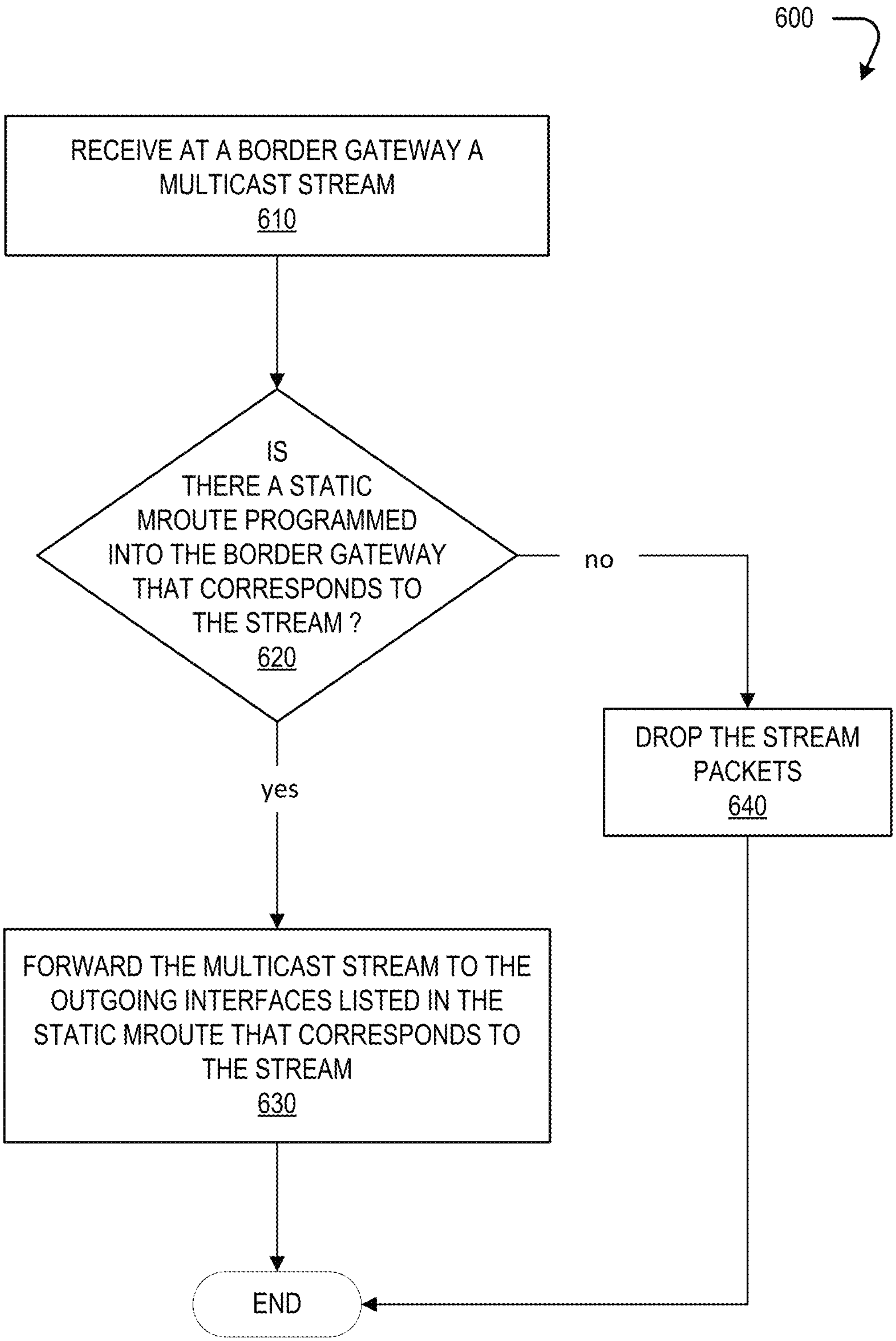
FIG. 6 is a flow diagram illustrating further details of a method for connecting heterogeneous multicast domains in accordance with examples set forth herein.

FIG. 6 is a flow diagram illustrating further details of a method for connecting heterogeneous multicast domains in accordance with examples set forth herein. Method 600 may be performed by any suitable processor of a border gateway device 102, 202, 302, for example, processing engines 204 or 304. The method 600 may further be performed by a combination of processors. In some examples, the method is performed by one or more processors executing machine readable instructions that comprise, at least in part, instructions corresponding to the operations of method 600. For discussion purposes, as an example, the method 600 is described as being performed by border gateway device 102*a* and it should be understood that the method is being performed by a processing engine 204, 304 of the border gateway device 102*a*.

The method 600 provides a more specific example of portions of the method 400, as well as other operations. Specifically, the method 500 may be performed as a more detailed implementation of block 440 of the method 400.

In step 610, the border gateway device 102*a* receives a multicast stream. The multicast stream may be received based on the static multicast programming in the multiple border gateway devices 102.

In step 620, a processing engine of the border gateway device 102*a* may determine if a static mroute is programmed into the border gateway device that corresponds to the received multicast stream. If in step 620, there is no static mroute programmed into the border gateway device that corresponds to the stream, then the border gateway device drops the stream packets at step 640. However, if there is a static mroute programmed into the border gateway device 102*a* that corresponds to the stream in step 620, then the border gateway device 102*a* forwards the multicast stream to the outgoing interfaces listed in the static mroute that corresponds to the multicast stream in step 630.

The methods, systems, devices, and equipment described herein may be implemented with, contain, or be executed by one or more computer systems. The methods described above may also be stored on a non-transitory computer-readable medium. Many of the elements may be, comprise, or include computers systems.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A method for connecting heterogeneous multicast domains, the method comprising:

programming, at first and second border gateway devices disposed respectively in first and second multicast domains, static multicast routes associated with a given multicast flow, each static multicast route including information identifying the given multicast flow, an incoming interface, and an outgoing interface;

sending join requests from the first border gateway device to at least one other network device in the first multicast domain utilizing a multicast protocol of the first multicast domain, in response to the programming of the static multicast route at the first border gateway device;

receiving a multicast stream at the first border gateway device from a source in the first multicast domain, the multicast stream corresponding to the given multicast flow;

forwarding the multicast stream from the first border gateway device to the second border gateway device based on the static multicast route programmed at the first border gateway device; and in response to receiving at the second border gateway a join request for the multicast stream device from a client device in the second multicast domain, delivering, from the second border gateway device, the multicast stream to one or more devices of the second multicast domain based on the static multicast route programmed at the second border gateway device.

2. The method of claim 1, wherein programing the static multicast route into the second border gateway device comprises entering the static multicast route into a routing information base (RIB) and the method further comprises copying information about the static multicast route from the RIB into a forwarding information base (FIB) in response to the received join request in order to deliver the multicast stream.

3. The method of claim 1, wherein the first and second multicast domains utilize different types of multicast protocols.

4. The method of claim 3, wherein the first and second multicast domains utilize different types of PIM protocols.

5. The method of claim 1, wherein the first and second multicast domains utilize different types of PIM protocols.

6. The method of claim 1, wherein multicast stream is forwarded from the first border gateway device to the second border gateway device without sharing any multicast control packets between the first and second border gateway devices.

7. The method of claim 1, wherein the multicast stream is forwarded from the first border gateway device to the second border gateway device through a virtual LAN tunnel.

8. The method of claim 1, wherein the one or more devices of the second multicast domain include one or more network devices and the method further comprises forwarding the multicast stream from the one or more network devices of the second multicast domain to one or more additional devices based on a multicasting protocol of the second multicast domain.

9. The method of claim 1, wherein programming the static multicast routes at the first and second border gateway devices comprises manually configuring the static multicast routes via a user interface.

10. The method of claim 1, wherein programming the static multicast routes at the first and second border gateway devices comprises causing a network controller to program the static multicast routes.

11. The method of claim 1, wherein the information identifying the given multicast flow in the programmed static multicast routes comprises information identifying a source and information identifying a multicast group.

12. The method of claim 1, wherein the information identifying the given multicast flow in the programmed static multicast routes comprises information identifying a multicast group and a wildcard for indicating any source.

13. A system for connecting heterogeneous multicast domains, the system comprising:

first and second border gateway devices disposed respectively in first and second multicast domains, the first and second border gateway devices programmed with static multicast routes each associated with a given multicast flow, each of the static multicast routes including information identifying the given multicast flow, an incoming interface, and an outgoing interface;

a first processing engine within the first border gateway device comprising a processor and memory;

configured to:

send join requests from the first border gateway device to at least one other network device in the first multicast domain utilizing a multicast protocol of the first multicast domain based on the programmed static multicast route at the first border gateway device, and in response to receiving a multicast stream from a source in the first multicast domain, the multicast stream corresponding to the given multicast flow, forward the multicast stream to the second border gateway device based on the static multicast route programmed at the first border gateway device;

and a second processing engine within the second border gateway device comprising a processor and memory;

configured to, in response to receiving a join request for the multicast stream from a client device in the second multicast domain, deliver, from the second border gateway device, the multicast stream to one or more devices of the second multicast domain based on the static multicast route programmed at the second border gateway device.

14. The system of claim 13, the second border gateway device comprising a database storing a routing information base (RIB) including the static multicast route, wherein the static multicast route is published from the RIB into a forwarding information base (FIB) in response to the received join request in order to deliver the multicast stream.

15. The system of claim 13, wherein the first and second multicast domains utilize different types of multicast protocols.

16. A border gateway device configured to connect a first multicast domain, which includes the boarder gateway device, to a second multicast domain in a network, the border gateway device comprising:

a database programmable with static multicast routes respectively associated with multicast flows, each of the static multicast routes including information identifying an associated multicast flow, an incoming interface, and an outgoing interface; and a processing engine comprising a processor and memory;

configured to:

in response to a first static multicast route being programmed into the database, the first static multicast route being associated with a first multicast flow having a source located in the first multicast domain, send join requests from the border gateway device to at least one other network device in the first multicast domain utilizing a multicast protocol of the first multicast domain, and in response to receiving a multicast stream corresponding to the first multicast flow from the first multicast domain, forward the multicast stream to a second border gateway device associated with the second multicast domain within the network, the forwarding based on the first static multicast route programmed at the border gateway device and without sharing any multicast control packets between the border gateway device and the second border gateway device.

17. The border gateway device of claim 16, wherein the processing engine is further configured to, in response to a second static multicast route being programmed into the database, for a second multicast flow having a second source in the second multicast domain, and further in response to receiving a second multicast stream corresponding to the second multicast flow and receiving a join request for the second multicast flow from a client within the first multicast domain, deliver from the border gateway device the second multicast stream to one or more devices of the first multicast domain based on the second static multicast route programmed at the border gateway device.

18. The border gateway device of claim 16, wherein the first and second multicast domains utilize different multicast protocols.

* * * * *